United States Patent [19]
Roof

[11] 4,244,651
[45] Jan. 13, 1981

[54] IMPERSONAL EYEPIECE FOR ASTRONOMIC POSITIONING

[76] Inventor: Edward F. Roof, 2205 Montgomery Ave., Woodbridge, Va. 22191

[21] Appl. No.: 13,108

[22] Filed: Feb. 21, 1979

[51] Int. Cl.³ ............................................. G01C 1/00
[52] U.S. Cl. ..................................... 356/142; 33/268; 356/247
[58] Field of Search ............... 356/142, 251, 252, 247; 33/268

[56] References Cited

U.S. PATENT DOCUMENTS

| | | | |
|---|---|---|---|
| 2,837,958 | 6/1958 | New House | 356/251 |
| 2,874,605 | 2/1959 | Williamson | 356/251 |
| 3,912,398 | 10/1975 | Zenk | 356/152 |
| 3,925,704 | 12/1975 | Camic | 315/200 A |
| 3,958,885 | 5/1976 | Stockinger et al. | 356/147 |
| 3,960,453 | 6/1976 | Svensson et al. | 356/252 |
| 3,963,356 | 6/1976 | Wiklund | 356/251 |

OTHER PUBLICATIONS

"Technical Instructions for 60° Pendulum Astrolabe" Engineer School, Ft. Belvoir, Va. Jan, 22, 1945, p. 13.

*Primary Examiner*—R. A. Rosenberger
*Attorney, Agent, or Firm*—Darrell E. Hollis

[57] ABSTRACT

An improved impersonal eyepiece for astronomic positioning is affixed to an optical viewing device to provide a means for observing the position of a celestial object at timed intervals. The viewing device produces a source image of the celestial object and a light source in the eyepiece is energized at timed intervals by a control circuit to illuminate a reticle mask and to thereby superimpose a reticle reference image on the source image during each of the timed intervals. The position of the celestial object with respect to the illuminated reticle is noted during each timed interval and the data so obtained is used to define a reference position.

28 Claims, 4 Drawing Figures

U.S. Patent    Jan. 13, 1981    4,244,651
FIG. 1
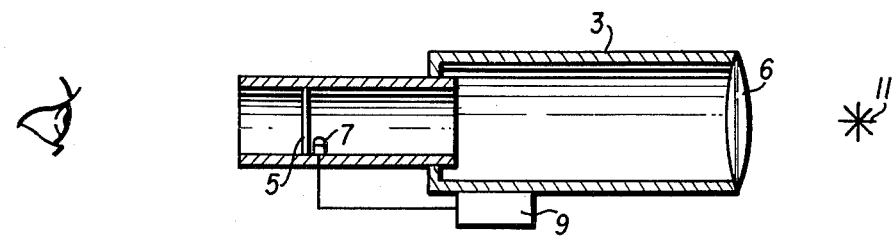
FIG. 2
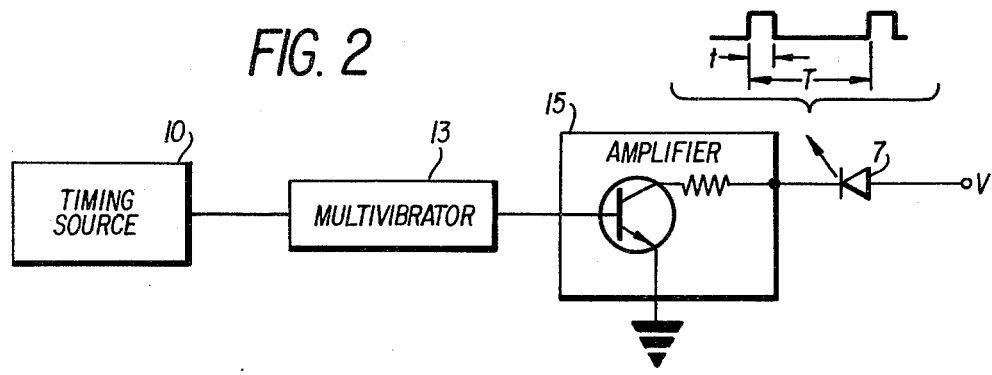
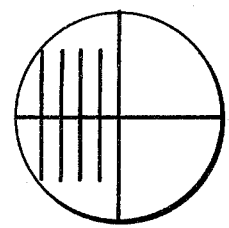
FIG. 3a
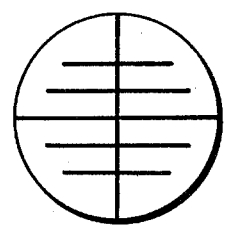
FIG. 3b

IMPERSONAL EYEPIECE FOR ASTRONOMIC POSITIONING

BACKGROUND OF THE INVENTION

The invention relates to an improved eyepiece for astronomic positioning and, more particularly, to such an eyepiece having electronic switching means for illuminating the reticle of a survey instrument at timed intervals to observe the position of a star with respect to the illuminated reticle.

It is known in the art relating to astronomic positioning to estimate the time of transit of a star across particular lines on the reticle of a viewing instrument. The Hunter shutter eyepiece described in Clark, "Plane and Geodetic Surveying", Vol. II, 5th Edition, pgs. 62-63, is one device that has been employed to reduce the personal measurement errors that typically characterize the observations of individual observers.

The Hunter shutter eyepiece may be attached to a viewing instrument such as a geodetic theodolite to automatically time successive rapid observations of the movement of a star and to thereby reduce the timing inaccuracies that result when an individual observer is required to independently observe both the position and corresponding transition time of the star.

The automatic timing of observations is performed by a movable shutter that is positioned in front of a glass plate having an engraved reticle and positioned in the focal plane of the objective of the viewing instrument. In operation, every three seconds the shutter is opened for 70 to 100 milliseconds to expose the star and to thereby allow the observer sufficient time to observe the position of the star relative to the reticle. Thereafter, the observer notes the time of the opening of the shutter and the corresponding estimated position of the star.

From the recorded data, a mean scale reading over a mean observation time may be computed for a corresponding series of rapid observations of the star. Thereafter, the time of the passage of the star over a known altitude or a vertical plane may be determined.

Since the shutter of the Hunter eyepiece is a mechanical device, the relatively rapid operation of the shutter results in vibrations that are transmitted to the associated viewing instrument. Therefore, the Hunter eyepiece is not suitable for operation with viewing instruments such as astrolabes that employ mercury pools or pendulum systems that may be sensitive to such vibrations.

In addition, since the apparatus of the Hunter eyepiece necessarily employs rapidly moving parts, it is prone to the various types of mechanical failure that are associated with such mechanisms.

Also, since the shutter of the eyepiece operates to pass light from the target star for a very short period of time, the amount of light that is received by the viewing eye is correspondingly small and therefore, it is correspondingly difficult for the eye to perceive a star of relatively low intensity or a star having a relatively high background lighting.

Accordingly, it is an object of the invention to provide an improved eyepiece for astronomic positioning having the advantages of the Hunter eyepiece but having no undesirable operational vibrations.

A further object of the invention is to provide such an improved eyepiece that will operate to continuously pass light from the target star to enable the observer to perceive stars of low intensity or stars having a high background lighting.

Another object of the invention is to provide such an eyepiece that operates electronically with no moving parts to provide increased reliability.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the improved eyepiece for astronomic positioning, according to the invention, includes means for observing the position of a celestial object at timed intervals.

More particularly, an embodiment of the invention utilizes a viewing device, for example a theodolite or an astrolabe to generate a source image of the object and to thereby observe the object.

The improved eyepiece includes a light source that is energized at timed intervals by a control circuit to periodically illuminate a reticle mask and to thereby superimpose a reticle reference image on the source image during each of the timed intervals.

During each timed interval the position of the celestial object with respect to the illuminated reticle is noted and the data so obtained may be used to define the movement of the celestial object with respect to a known reference position.

The light source may be filtered to produce a reticle reference image having a color that contrasts with the color of the source image.

BRIEF DESCRIPTION OF THE DRAWINGS

FIG. 1 shows an elevation view in section of an embodiment of an improved eyepiece in accordance with the invention.

FIG. 2 shows a block diagram of a timing circuit that may be used to energize the light source of the improved eyepiece in accordance with the invention.

FIG. 3a shows a reticle that may be used for an embodiment of the invention utilizing the Mayer method of longitude determination.

FIG. 3b shows a reticle that may be used for an embodiment of the invention utilizing the equal altitude method of measurement.

DETAILED DESCRIPTION OF PREFERRED EMBODIMENTS

The remaining portion of this specification will describe preferred embodiments of the invention when read in conjunction with the attached drawings, in which like reference characters identify identical apparatus.

FIG. 1 shows an elevation view in section of an embodiment of an improved eyepiece in accordance with the invention. It will be appreciated from an examination of FIG. 1 that, in accordance with the invention, a viewing instrument 3 for example, a telescope, theodolite, astrolabe or other optical instrument may be used to view a target star 11. A transparent plate 5 having a reticle etched thereon is positioned in a manner known to the art in the focal place of the objective 6 of the viewing instrument 3.

A light source, for example a light emitting diode (LED) 7 is mounted adjacent the transparent plate 5 on the inner wall of the viewing instrument 3. In accordance with the invention, the LED 7 is periodically energized by a timing circuit 9 that may be mounted in a suitable enclosure on the viewing instrument 3. The timing circuit 9 is adapted to receive timing pulses from any timing source that is typically used in making astronomic positioning measurements, for example a break-circuit chronometer. The timing circuit 9 then operates to generate corresponding pulses that are applied to energize the LED 7 for a time t at a period T.

In operation, the viewing instrument 3 is moved to view a particular target star 11 so as to place the target star 11 within the reticle on the plate 5. Thereafter, the viewing instrument 3 is maintained in a stationary position and the light from the target star is continuously viewed through the viewing instrument 3. At a time defined by an energizing pulse for the LED 7, the LED 7 is turned on and the reticle of the plate 5 is thereby illuminated.

In accordance with the invention, the energized LED 7 generates a colored light, for example red, so that the image of the star appears as a white spot against a red reticle background. This color contrast serves to enhance the image of the star, thereby providing a means to easily observe stars of reduced intensity. It has been experimentally determined that with such a color contrast scheme, stars of a magnitude of 6.0 are easily observed.

The time t that the LED 7 is energized is sufficiently long to allow the observer to note the location of the target star 11 with respect to the reticle on the plate 5 but is short enough to ensure that the target star 11 does not move while its position with respect to the reticle is being observed. It has been experimentally determined that an appropriate energization interval t for the LED 7 is in the range of from 20 to 100 milliseconds.

Immediately after the LED 7 has been energized and the position of the target star 11 has been noted, the operator must record the time of the energization and the corresponding position of the target star 11 with respect to the reticle. At a time T after the application of the energizing pulse to the LED 7, a next successive energizing pulse will be applied to again turn on the LED 7.

It has been determined thaat an appropriate period T for the energizing pulses may be either 2 or 3 seconds, although it should be apparent that another period T could be used if it is sufficiently long to allow the observer to record his observation of the position of the target star 11 before the next successive pulse is applied to energize the LED 7.

FIG. 2 illustrates a block diagram of the timing circuit 9 of FIG. 1. In operation, pulses having a period T are generated by a timing source 10 and are applied to a monostable multivibrator 13 that is adapted to generate corresponding pulses having a pulse width t.

It will be apparent to those skilled in the art that the multivibrator 13 will be operated from a stable state to a quasi-stable state in response to a triggering pulse. The duration of the quasi-stable state will define the output pulse width of the multivibrator and will be determined by an adjustable RC circuit within the multivibrator.

It will be appreciated by those skilled in the art that such multivibrators are commercially available and may easily be adapted to receive input pulses and generate corresponding output pulses having a particular pulse width. Several such multivibrator circuits are particularly described in the U.S. patent to Wiklund, U.S. Pat. No. 3,963,356.

The pulses at the output of the multivibrator 13 are applied to an amplifier 15 that amplifies the pulses in a manner known to the art and applies the amplified pulses to the LED 7 to energize the LED for a time period t corresponding to the pulse width of the energizing pulse, at a pulse repetition rate that is defined by the period of the pulses T.

The amplifier 15 may include a power transistor that is turned on in response to a pulse from the multivibrator 13 and remains turned on for the duration of the pulse to conduct current and thereby energize the LED 7.

FIG. 3 illustrates two reticle patterns that may be engraved or otherwise applied to the plate 5. The reticle shown in FIG. 3a may typically be used for operation in accordance with the invention with theodolites utilizing the Mayer method of longitude determination. The reticle of FIG. 3b may be used for operation with astrolabes that utilize the equal altitude method of measurement. It should be understood that the reticles of FIG. 3 are provided for illustrative purposes only and that the apparatus of the invention is easily adapted to operate with a reticle of any desired pattern.

Also, it should be understood that the invention is not limited to a particular means for imposing the image of the reticle on the viewed celestial image, since any reticle imaging means that allows the reticle to be periodically viewed in a fixed relation to the celestial image may be used in accordance with the invention. For example, the apparatus of the invention could be modified to project a reticle pattern through the objective of a celestial viewing device in the manner described in the U.S. patent to Litman, U.S. Pat. No. 3,936,137 and the reticle could be periodically projected in accordance with the invention to obtain astronomical data.

It should be understood that the data that is recorded in accordance with the operation of the invention may be applied to calculate the transit time of the target star 11 in the same manner that similar data from a hunter shutter eyepiece is applied.

More particularly, the time of transit of the target star is determined according to the expression: $\frac{1}{2}(t_1+t_2)+\frac{1}{2}(s_1-s_2)S \sec \delta + \frac{1}{2}(t)$, where $t_1$ is the mean on all "ON" times of the LED before transit, $t_2$ is the mean of all "ON" times of the LED after transit, $s_1$ is the mean of all scale readings of the position of the star at LED "ON" times before transit, $s_2$ is the mean of all scale readings of the position of the star at LED "ON" times after transit, S is the value of distance between two adjacent lines for an equatorial star, $\delta$ is the declination of the star being observed and t is the time that the LED is turned on by an energization pulse. Representative calculations for a Hunter shutter eyepiece are particularly described in Bomford, "Geodesy", Second Edition, pgs. 295–296.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An astronomical positioning apparatus of a type wherein an optical viewing device is used to continuously produce a source image of a celestial object to observe the object and the position of said celestial object is measured periodically once each period T for a time interval t, comprising: projection means for superimposing the image of a spatial reference pattern reticle on said source image during said time intervals to display the position of said celestial object with respect to said reference reticle image during said time intervals.

2. The apparatus of claim 1 wherein said projection means includes:
reticle mask means for defining a fixed reference pattern;
light source means for illuminating said reticle mask means to form said superimposed reference reticle image; and
control means for energizing said light source means during said time intervals.

3. The apparatus of claim 2, wherein said light source means includes a light emitting diode.

4. The apparatus of claim 2 wherein said light source means includes means for generating light at a wavelength that produces a red reference reticle image.

5. The apparatus of claim 2 wherein said control means includes:
multivibrator means for receiving timing signals having a period T and generating corresponding strobe pulses having a period T and pulse width t; and
amplifier means for receiving said strobe pulses and generating corresponding amplified pulses to energize said light source means for said time intervals corresponding to the pulse width t.

6. The apparatus of claim 5 wherein said multivibrator means includes means for defining an adjustable pulse width t in the range of 20 to 100 milliseconds.

7. The apparatus of claim 5 wherein said multivibrator means includes means for receiving timing signals having a period of at least two seconds and generating corresponding strobe pulses having an adjustable pulse width in the range of 20 to 100 milliseconds.

8. An apparatus for observing the position of a celestial object comprising:
viewing means for continuously generating a source image of said celestial object for observation;
reticle means for defining a spatial reference pattern;
light source means for illuminating said reticle means to form a corresponding reference reticle image having a color contrasting to the color of said source image and superimposed on said source image; and
control means for energizing said light source means periodically once each period T for a time interval t to display the position of said celestial object with respect to said reference pattern during said time interval.

9. The apparatus of claim 8 wherein said viewing means is an astrolabe.

10. The apparatus of claim 8 wherein said viewing means is a theodolite.

11. The apparatus of claim 8, wherein said light source means includes a light emitting diode.

12. The apparatus of claim 8 said light source means includes means for generating light at a wavelength that produces a red reference reticle image.

13. The apparatus of claim 8 wherein said period T is at least two seconds in duration.

14. The apparatus of claim 13 of wherein said time interval is from 20 to 100 milliseconds in duration.

15. The apparatus of claim 8 wherein said time interval is from 20 to 100 milliseconds in duration.

16. The apparatus of claim 8 wherein said control means includes:
multivibrator means for receiving timing signals having said period T and generating corresponding strobe pulses having said period T and a pulse width t; and
amplifier means for receiving said strobe pulses and generating corresponding amplified pulses to energize said light source means for said time interval corresponding to the pulse width t.

17. The apparatus of claim 8 wherein said multivibrator means includes means for defining adjustable pulse width t in the range of 20 to 100 milliseconds.

18. The apparatus of claim 8 wherein said multivibrator means includes means for receiving timing signals having a period of at least two seconds and generating corresponding strobe pulses having an adjustable pulse width in the range of 20 to 100 milliseconds.

19. An apparatus for observing the position of a celestial object comprising:
(a) a viewing instrument having a focal plane for continiously generating a source image of said celestial object for observation;
(b) a reticle defining a spatial reference pattern disposed in said focal plane;
(c) a light source having a color contracting to the color of said source image for illuminating said reticle thereby superimposing said spatial reference pattern upon said source image; and
(d) control means for energizing said light source periodically once each period T for a time interval t to display the position of said celestial object with respect to said spatial reference pattern during said time interval.

20. The apparatus of claim 19 wherein said reticle comprises a transparent plate having said spatial reference pattern etched thereon.

21. The apparatus of claim 19 wherein said light source includes a light emitting diode.

22. The apparatus of claim 19 wherein said light source includes means for generating light at a wavelength that produces a red spatial reference pattern.

23. The apparatus of claim 19 wherein said period T is at least two seconds in duration.

24. The apparatus of claim 23 wherein said time interval is at least 20 to 100 milliseconds in duration.

25. The apparatus of claim 19 wherein said period T is from 20 to 100 milliseconds seconds in duration.

26. The apparatus of claim 19 wherein said control means includes:
(a) multivibrator means for receiving timing signals having said period T and generating corresponding strobe pulses having said period T and a pulse width t; and
(b) amplifier means for receiving said strobe pulses and generating corresponding amplified pulses to energize said light source means for said time interval corresponding to the pulse width t.

27. The apparatus of claim 26 wherein said multivibrator means includes means for defining an adjustable pulse width t in the range of 20 to 100 milliseconds.

28. The apparatus of claim 26 wherein said multivibrator means includes means for receiving timing signals having a period of at least two seconds and generating corresponding strobe pulses having an adjustable pulse width in the range of 20 to 100 milliseconds.

* * * * *